J. J. DAVIS & T. F. TERRY.
PROTECTIVE WATER GAGE GLASS FOR BOILERS.
APPLICATION FILED MAR. 10, 1913.

1,090,519.

Patented Mar. 17, 1914.
2 SHEETS—SHEET 1.

ATTEST
E. M. Fisher
J. C. Musuin.

INVENTORS
John James Davis
Thomas F. Terry
BY Fisher Albert
ATT'YS

J. J. DAVIS & T. F. TERRY.
PROTECTIVE WATER GAGE GLASS FOR BOILERS.
APPLICATION FILED MAR. 10, 1913.
1,090,519.
Patented Mar. 17, 1914.
2 SHEETS—SHEET 2.
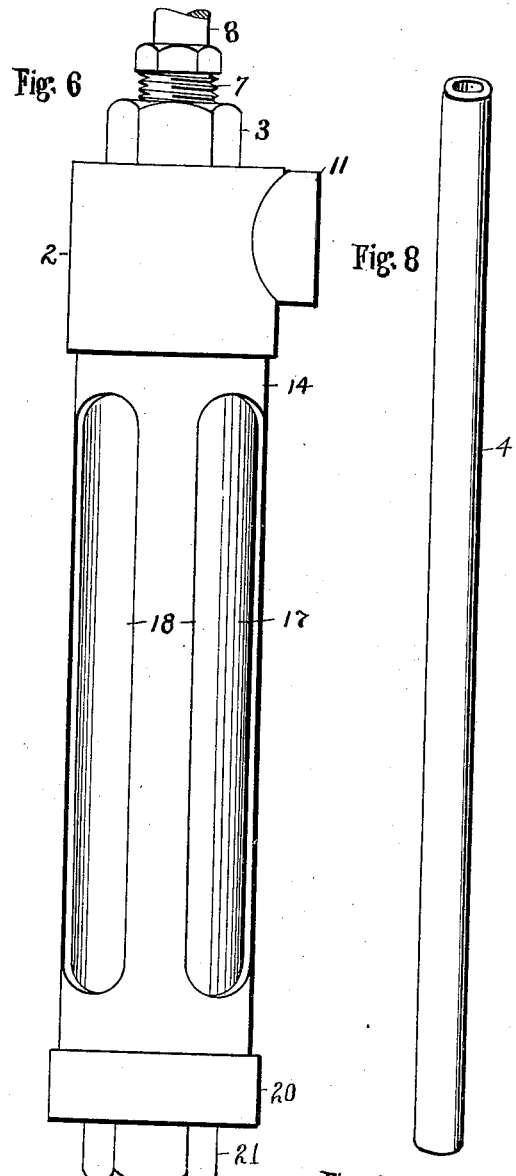
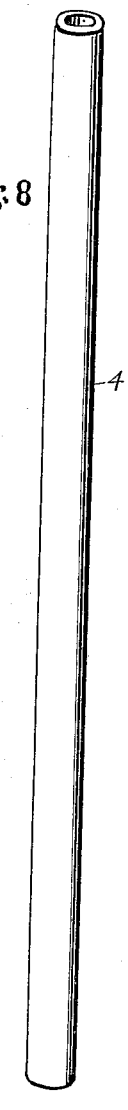
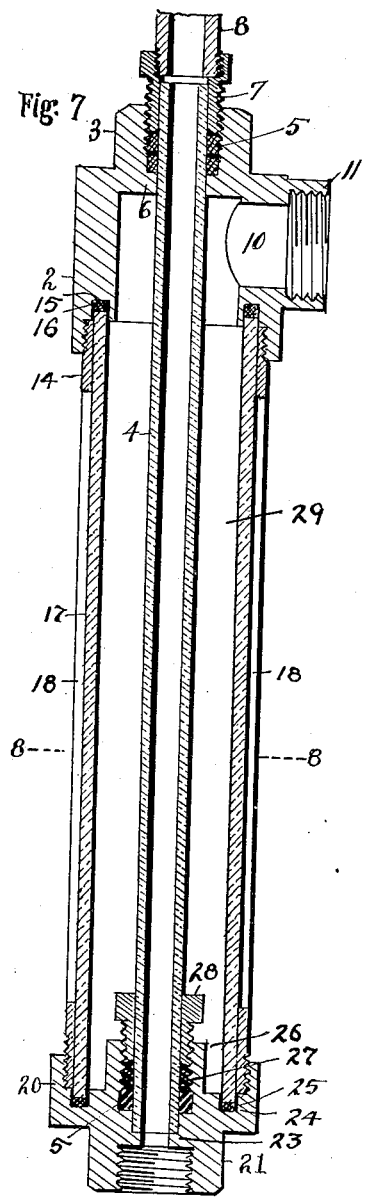

UNITED STATES PATENT OFFICE.

JOHN JAMES DAVIS AND THOMAS F. TERRY, OF CLEVELAND, OHIO.

PROTECTIVE WATER-GAGE GLASS FOR BOILERS.

1,090,519. Specification of Letters Patent. Patented Mar. 17, 1914.

Application filed March 10, 1913. Serial No. 753,306.

*To all whom it may concern:*

Be it known that we, JOHN JAMES DAVIS and THOMAS F. TERRY, citizens of the United States, residing at Cleveland, in the county of Cuyahoga and State of Ohio, have invented certain new and useful Improvements in Protective Water-Gage Glasses for Boilers, of which the following is a specification.

This invention comprises an improved protective water gage glass for boilers, particularly locomotive boilers, substantially as herein shown and described and more particularly pointed out in the claims.

It is generally known that the water gage glass of a boiler is likely to break, because of accident or unequal temperature. In a locomotive cab, where the attendant is necessarily closely confined, any breakage of the glass is dangerous, not only from the flying particles of glass but also from the steam and hot water which is suddenly released.

Our inventive concept involves the use of two glass tubes supported in sleeved relation within a casing and support, the inner tube being in open communication at both ends to the boiler and the outer tube having a pipe connection leading to the outside of the locomotive cab, whereby protection is afforded to the occupants of the cab in the event of breakage of the inner glass tube.

Figure 1:
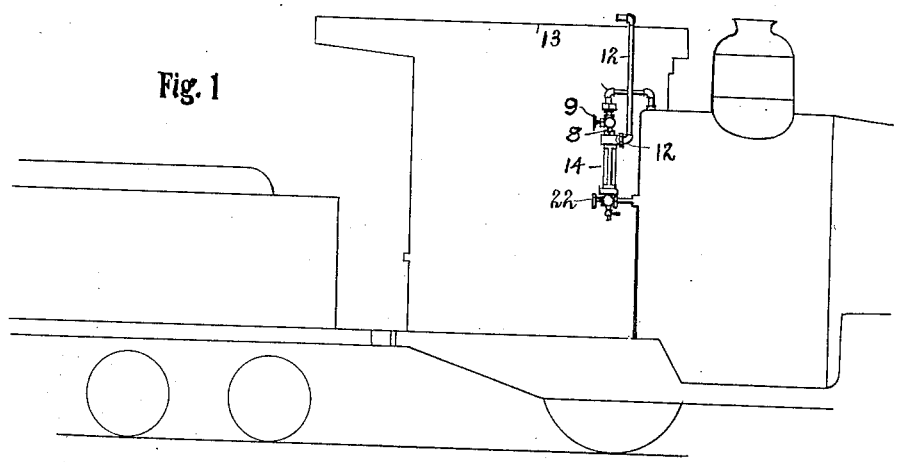
Figure 2:
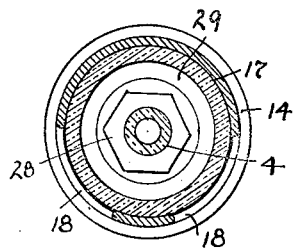
Figure 3:
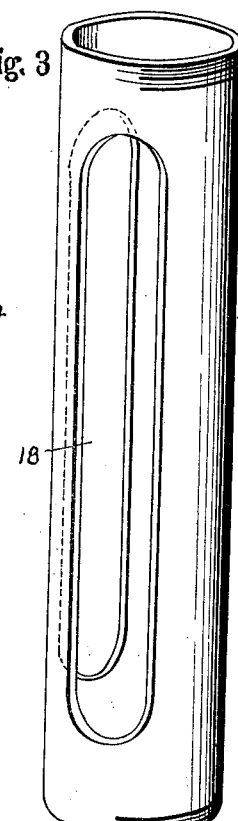
Figure 4:
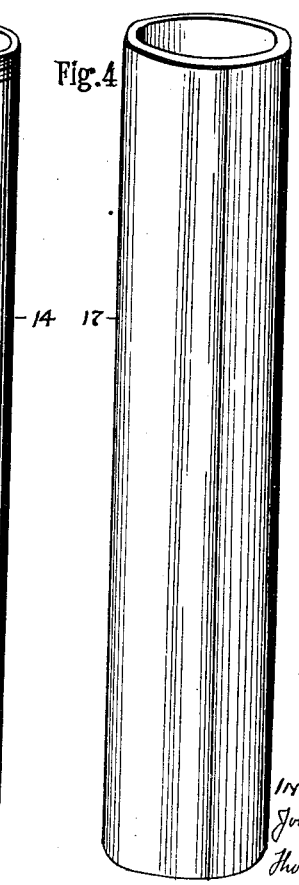
Figure 5:
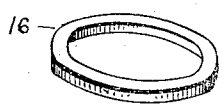

In the accompanying drawings, Figure 1 is a diagrammatic view of a portion of a locomotive, showing our improved device mounted thereon. Fig. 2 is a cross section of the water gage glass on line 8—8, Fig. 7. Fig. 3 is a perspective view of the metal sheath, and Fig. 4 a perspective view of the outer protecting glass tube. Fig. 5 is a perspective view of one of the rubber gaskets for the outer glass tube. Fig. 6 is a side elevation of the water gage glass parts assembled, less the top and bottom valve connections which are commonly provided. Fig. 7 is a vertical section centrally through the device. Fig. 8 is a perspective view of the inner glass tube, and Fig. 9 shows a pair of rubber gaskets adapted to slip over said tube.

In detail, the device comprises a hollow head 2 having a hexagonal extension 3 provided with an internally screw-threaded bore through which the glass tube 4 is adapted to project. Gaskets 5 resting on seat 6 encircle tube 4 and the tubular nut 7 compresses said gaskets within the bore and against the tube to effect a steam and water tight joint. The upper end of the nut 7 above the tube is internally threaded to receive the connecting pipe or part 8 leading to the boiler, and a union connection (not shown) may be employed in this line of pipe to permit convenient detachment of the parts and removal of the tube 4 when it requires cleaning or replacement. A valve 9 is also usually employed in this line of pipe connections, see Fig. 1. Head 2 has a side opening 10 and a threaded boss 11 for a pipe 12 (Fig. 1) which projects through the top (or side) of the cab 13, and this pipe may also have a union coupling to permit convenient attachment and detachment of the parts. The bottom end of head 2 is internally threaded to screw-engage with the upper threaded end of the cylindrical metal sheath 14, and an annular channel 15 is provided in the bottom of the head to seat a rubber gasket 16 and the upper end of the protecting glass tube 17. Hollow head 2 is open to this tube 17, and the metal sheath 14 has one or more slots 18 lengthwise thereof to permit a free and unobstructed view of the interior of the tube and particularly of the inner tube 4 to see the level of the water therein. The inner rounded surface of the sheath 14 is covered with a white or other light-reflecting coating so that the inner tube and the water therein may be more plainly seen. The bottom end of sheath 14 is also threaded to engage a coupling member 20 having a bottom projection 21 of hexagonal form which is internally threaded to connect with a pipe or valve 22 (Fig. 1) which in turn connects with the boiler as usual. An open seat 23 centrally within the bottom of member 20 engages the lower end of the inner tube 4 and supports said tube, and an annular channel 24 of the same diameter as outer tube 17 holds a rubber gasket 25 for the bottom end of said tube. An upwardly-extending boss 26 of coupling member 20 also confines a gasket or pair of rubber gaskets 27 which have slip connection with inner tube 4 and a nut 28 encircling the tube has threaded engagement with said boss to compress the gaskets in making a water-tight union at this point.

The outer glass tube 17 is relatively thicker than the inner glass tube, and also very much greater in diameter to provide a large chamber 29 about the same. The sheath 14 fits snugly over outer glass tube 17 and reinforces it against internal pressure when such occur, as in the event of breakage of inner tube 4. The heavier and much larger tube 17 and its metal sheath 14 effectively resist any sudden release of steam and water if tube 4 is broken or shattered and relief is also afforded by reason of the open pipe connection 12 to the atmosphere. The escape of steam and water being through this channel and not into the cab, the attendant is immediately able to shut off the valves 9 and 22 without exposure or danger of scalding by the steam or hot water. Nor are the occupants of the cab liable to injury by flying pieces of glass from the inner tube as the outer tube prevents scattering thereof. Glass tube 17 is strong enough to withstand bursting of the inner tube 4, but if it should be broken, shield 14 still affords protection. This shield may be an integral part or extension of either one of the coupling members 2 or 20.

What we claim is:

1. In a water gage glass for boilers, inner and outer glass tubes of different diameters, supports for the ends of said tubes and gaskets therein for said inner tube, a metal sheath about the outer of said tubes having threaded connection at its ends in said supports and binding the same upon said tubes and pipe connections for said supports and tubes, the upper of said supports having an outlet open to the space between said tubes.

2. In a water gage glass for boilers, an inner glass tube and a protecting glass tube about the same and apart therefrom, supports for the ends of said tubes having seats therefor and gaskets therein and a metal sheath about said protecting tube connecting said supports and binding said parts on said tubes, boiler connections detachably engaged with said supports for the inner tube and a waste pipe connection open to the space between said tubes having its discharge through the upper of said supports.

3. In a water gage glass for boilers, a head having a central bore and a side outlet, a glass tube passing through said bore and packed therein, a second glass tube surrounding said first tube seated at one end in said head and in a coupling at the other, a cylindrical metal sheath uniting said head and coupling and fitting about said second tube and a boiler connection open to the said inner tube, and a waste pipe connection for said head open to the second tube.

In testimony whereof we affix our signatures in presence of two witnesses.

JOHN JAMES DAVIS.
THOMAS F. TERRY.

Witnesses:
E. M. FISHER,
R. B. MOSER.

---

Copies of this patent may be obtained for five cents each, by addressing the "Commissioner of Patents, Washington, D. C."